United States Patent [19]

Nishida et al.

[11] Patent Number: 5,705,970
[45] Date of Patent: Jan. 6, 1998

[54] RARE-EARTH CONTAINING IRON-BASE RESIN BONDED MAGNETS

[75] Inventors: Shigeru Nishida; Takafumi Kuwazawa; Tetsuo Hoshina, all of Nagano, Japan

[73] Assignee: Kabushiki Kaisha Sankyo Seiki Seisakusho, Nagano, Japan

[21] Appl. No.: 386,761

[22] Filed: Feb. 10, 1995

Related U.S. Application Data

[63] Continuation-in-part of Ser. No. 323,656, Oct. 17, 1994, abandoned.

[30] Foreign Application Priority Data

| Oct. 15, 1993 | [JP] | Japan | 5-281970 |
| Feb. 10, 1994 | [JP] | Japan | 6-16496 |
| May 31, 1994 | [JP] | Japan | 6-140777 |
| Jan. 6, 1995 | [JP] | Japan | 7-16480 |

[51] Int. Cl.$^6$ ........................... H01F 3/00
[52] U.S. Cl. ........................... 335/303; 335/306
[58] Field of Search ........................... 335/303–306

[56] References Cited

U.S. PATENT DOCUMENTS

| 5,009,706 | 4/1991 | Sakamoto et al. | 75/244 |
| 5,389,176 | 2/1995 | Nakanishi et al. | 156/242 |
| 5,414,396 | 5/1995 | Bagalini | 335/179 |

*Primary Examiner*—Lincoln Donovan
*Attorney, Agent, or Firm*—Sughrue, Mion, Zinn, Macpeak, and Seas

[57] ABSTRACT

A motor having rotor has a good balance of inertia and a magnetic characteristic that match the specifications of the motor with which those rotors are to be used. A rare-earth containing iron-base resin-bonded magnet is molded from an iron-base magnetic powder containing a rare earth metal such as neodymium and praseodymium in powder, a thermoplastic or thermosetting resin and additive. A density and magnetic characteristic is proportionally changed by adjusting a mixing ratio of a filler powder. Specifically, when a mixing ratio of filler powder containing tungsten having a density 19.1 g/cm$^3$ is in 13 vol % is injected, or a mixing ratio of alloy powder containing tungsten an nickel, or tungsten and chromium having a density 10.5 g/cm$^3$ is compression-mold, its magnetic flux assume the same value as those of compression-molded Sm—Co magnets.

18 Claims, 8 Drawing Sheets

RARE-EARTH CONTAINING IRON-BASE RESIN BONDED MAGNETS

This is a continuation-in-part of application Ser. No. 08/323,656 filed Oct. 17, 1994, now abandoned.

BACKGROUND OF THE INVENTION

1. Field of the Invention

The present invention relates to rare-earth containing iron-base resin-bonded magnets that comprise Fe (iron) as the principal component, that contain a rare earth metal such as Nd (neodymium) or Pr (praseodymium) and that use a resin as a binder. The invention also relates to a motor that uses such magnets. The present invention relates to rare earths—iron resin-bonded magnets and more particularly to a resin-bonded magnet produced by mixing magnetic powder of the iron family containing Fe as main raw material and rare earths such as Nd (neodymium) or Pr (praseodymium), for example; and W (tungsten) alloy filler powder having specific gravity greater than that of the former in order to increase the specific gravity of the magnet. The present invention relates to improvements in bonded magnets prepared by adding synthetic resin as a binder to magnetic powder containing rare earth metal, iron and boron, and curing the mixture.

2. Related Art

Resin-bonded magnets are conventionally formed by injection molding, extrusion molding or compression molding of mixtures of magnetic powders (rare earth metals, and ferrites, etc.) with thermoplastic or thermosetting resins. When thermosetting resins are used, the molded articles are post-cured by heating. The resin-bonded magnets are inferior to sintered magnets in terms of magnetic characteristics; on the other hand, they are thin-walled and permit close tolerances, which enables the formation of complexly shaped magnets. Hence, the resin-bonded magnets are currently used in various fields, the scope of which is constantly expanding.

With the recent trend toward lighter weight, smaller thickness, shorter length and smaller volume, the magnets used in motors and the like are required to be capable of producing higher outputs in smaller size and the transition from the existing ferritic magnets to rare-earth magnets (Sm—Co and Nd—Fe—B magnets) is under way.

Under these circumstances, the demand for rare-earth containing iron-based resin-bonded magnets has accelerated since they have such high magnetic characteristics that they prove to be very effective in enhancing the performance of speakers and motors that use them. In addition, as the size of motors and the like decreases, there is a growing need to use more complexly shaped magnets. It is well known to produce rare-earth containing iron-base resin-bonded magnets by applying compression and injection molding techniques which are commonly employed in the manufacture of ordinary resin-bonded magnets (see Unexamined published Japanese Patent Application (kokai) Hei 1-103806). As binders, thermosetting resins such as epoxies or thermoplastic resins such as nylons are used in several percent by weight. In certain cases, a variety of additives (e.g., lubricants and coupling agents) may be incorporated.

However, rare-earth containing iron-base resin-bonded magnets which contain rare earth metals such as Nd or Pr and which use resin binders, as exemplified by B (boron) containing Nd—Fe—B magnets, have such smaller specific gravities than Sm—Co magnets that in apparatus such as motors that use the Nd—Fe—B magnets, the imbalance between the small inertia due to their low specific gravity and their high magnetic characteristics will cause defects such as magnetic noise, which occasionally presents limitations during use.

As taught in Unexamined Published Japanese Patent Application (kokai) Hei 1-103806, supra, the amount of mixing resin binders can be varied so that the specific gravity and magnetic characters of the mixture are changed, whereby its inertia and magnetic characteristics can be altered to some extent in accordance with the specific needs of the apparatus. In fact, however, the effectiveness of this approach is not satisfactory since the alterations in inertia and magnetic characteristics are small and are not proportional to the amount of mixing the resins.

Since the Nd—Fe—B magnet is mainly composed of Fe, it is easily rusted and needs rust-proofing. Therefore, a resin coating is provided for such a magnet for the purpose.

When this magnet is used in a rotor, the external diameter of the magnet is decreased to the extent of the thickness of a rust preventive coating before a rust preventive process is applied thereto so as to secure the gap between a stator portion and the surface of the magnet as in the case of an Sm—Co magnet. Nevertheless, the magnetic characteristic (flux) lowers as the external diameter of the magnet is decreased.

In the case of a Sm—Co magnet, moreover, the magnetic characteristics are restricted and may fail to satisfy those required according to its uses.

SUMMARY OF THE INVENTION

An object, therefore, of the invention is to provide a rare-earth containing iron-base resin-bonded magnet efficiently that has a good balance between inertia and a magnetic characteristic that match the apparatus with which the magnet is to be used and that yet can be produced in complex shapes.

Another object of the invention is to provide a motor that has a good balance between magnetic characteristic and inertia.

Another object of the present invention is to provide such a magnet that the introduction of a filler therein is set free from noise-causing and that the magnetic characteristics varying with the thickness of a rust preventive coating is made conformable to the magnetic characteristics required in molding rust preventing processes.

Another object of the present invention intended to solve the foregoing problems is to provide an Nd—Fe—B bonded magnet which is designed to weaken the action of an inhomogeneous metal-to-metal local battery and consequently made corrosion-resistant.

To attain these objects, the present invention is implemented by first mixing an iron-base magnetic powder containing a rare earth metal such as Nd (neodymium), Pr (praseodymium) or the like with a suitable amount of the powder of a filler having a suitable density or specific gravity and particle size that is selected from among W (tungsten), Ni (nickel), Co (cobalt), Cu (copper), Fe (iron), Cr (chromium), Si (silicon), C (carbon), Mn (manganese), Mo (molybdenum), Ti (titanium), Zn (zinc), Pb (lead), Sn (tin) and Al (aluminum), as well as combinations thereof. The rare-earth metal (e.g., Nd or Pr) containing iron-base magnetic powder may be prepared by a suitable method such as rapid quenching or hydrogen occlusion (HDDR) and, thereafter, it is treated with a silane- or titanate-based coupling agent or other additives. These coupling agents are necessary in the case where thermoplastic resins such as nylons which have no bondability to metals are used as binders but they are not necessary if thermosetting resins bondable to metals are used as binders.

The powders of fillers may be prepared in the following manner: filler materials that are manufactured commercially and which are easily available at comparatively low price, such as one or more elements selected from among W, Ni, Co, Cu, Fe, Cr, Si, C, Mn, Mo, Ti, Zn, Pb, Sn, Al, etc. are formulated to suitable densities or specific gravities and subsequently alloyed to prepare particles by rapid quenching, atomization, mechanical alloying, casting and various powder metallurgical procedures, with the particles being then conditioned in grain size. Alternatively, W, Ni, Co, Cu, Fe, Cr, Si, C, Mn, Mo, Ti, Zn, Pb, Sn, Al, etc. are mixed in powder form without alloying or subjected to powder plating, thereby preparing particles having suitable densities or specific gravities, which are then conditioned in grain size.

Simultaneously with or after the mixing of the rare-earth containing iron-base magnetic powder with the filler powder, a thermoplastic resin such as nylon 6 or nylon 12 or an epoxy-based or phenolic thermosetting resin is coated as a binder on the particles of the powders in an amount of 5 to 20 wt % or 5 to 20 vol %; this coating operation may be applied to both powders at a time or the coating operation on the iron-base magnetic powder may be separated from that on the filler powder. Simultaneously with or after the coating step, a lubricant such as oleic acid in a liquid form or calcium stearate in a powder form (which also serve as additives) or a hydrazine containing antioxidant is added. After these mixing and addition steps, injection molding, compression molding, extrusion molding or some other suitable processing is done to produce a rare-earth containing iron-base resin-bonded magnet of a predetermined shape. If desired, pellets may be prepared after the mixing of various components so that molding is performed on such pellets.

If injection molding is to be done, the rare-earth containing iron-base magnetic powder is usually treated with a silane- or titanate-based coupling agent or the like which also serve as additives and a thermoplastic resin such as nylon 6 or nylon 12 is used as binder. The binder to be used in the case of compression molding is typically an epoxy-bonded or phenolic thermosetting resin. After molding with a press at 5 to 10 tens/cm$^3$, post-cure is effected by heating at 100° to 150° C. for about 1 h. On the other hand, the binder to be used in the case of extrusion molding is typically a thermoplastic resin such as nylon 6 or nylon 12. The mixture is kneaded at a temperature of 230° to 280° C. to prepare a magnet compound, which is then molded with a screw-type or some other suitable extrusion molding machine.

According to the present invention, a resin-bonded magnet is produced by mixing magnetic powder of the iron family containing rare earths such as Nd or Pr, for example, W alloy filler powder having specific gravity greater than that of the magnetic powder of the ion family, thermosetting resin and a small amount of additive together; and by compression-molding the mixture. Further, 1~3 wt % resin, a 20~50 w % filler and magnetic powder as the remainder in a weight ratio are mixed together and the filler has a means grain size of not smaller than 30 μm. Further, the filler is an alloy of W and Ni and Co or Fe, and 25~45 w % W in a weight ratio is added. Further, the filler is an alloy of W and Ni, and a rust preventive resin coating is applied to the inner or outer periphery of the magnet. In this manner, there is provided a magnet having magnetic characteristics and specific gravity set in line with apparatus for use.

A bonded magnet according to the present invention is produced by mixing a synthetic resin binder with magnetic powder containing rare earth metal (R), iron (Fe) and boron (B), and further adding to the mixture Ni—W alloy mixed powder to which a proper amount of one of the elements Cr, Mo, Zn and Al has been added.

The Ni—W alloy mixed powder preferably but not exclusively contains 64~70 wt % Ni and 36~30 wt % W.

The compounding of one of the elements Cr, Mn, Zn and Al is increased or decreased in proportion to that of the Ni—W alloy mixed powder; however, the loadings should preferably range from 1 to 10 wt %.

In the present invention, the powder of at least one filler having a suitable density or specific gravity and particle size that is selected from among W, Ni, Co, Cu, Fe, Cr, Si, C, Mn, Mo, Ti, Zn, Pb, Sn, Al, etc. is added in a suitable amount and the density of the magnet as the final product will increase in proportion to the addition of the filler powder. On the other hand, the magnetic flux which is one of the important characteristics of the magnet will decrease in proportion to the addition of the filler powder.

Consider, for example, the case of adding a tungsten filler powder having a density of 19.1 g/cm$^3$. In the absence of any filler powder, an injection molded rare-earth containing iron-base resin-bonded magnet has a density of 5.5 g/cm$^3$, which will increase as the tungsten filler powder is added in increasing amounts; at 60 wt % loading, the magnet has a density of 12.4 g/cm$^3$. In the absence of any filler powder, the injection molded rare-earth containing iron-base resin-bonded magnet has a magnetic flux of 0.19 μWb, which will decrease as the tungsten filler powder is added in increasing amounts; at 60 wt % loading, the magnet has a flux of 0.055 μWb.

Also, consider the case of adding a tungsten-nickel alloy filler powder (29.3 wt % W and 70.0 wt % Ni) having a density of 10.5 g/cm$^3$. In the absence of any filler powder, a compression molded rare-earth containing iron-base resin-bonded magnet has a density of 5.9 to 6.0 g/cm$^3$, which will increase as the W—Ni filler powder is added in increasing amounts; at 35 wt % loading, the magnet has a density of 7.0 to 7.15 g/cm$^3$. In the absence of any filler powder, the compression molded rare-earth containing iron-base resin-bonded magnet has a magnetic flux of 0.236 to 0.244 μWb, which will decrease as the W—Ni filler powder is added in increasing amounts; at 35 wt % loading, the magnet has a flux of 0.14 to 0.15 μWb.

By thusly increasing the density while reducing a magnetic characteristic through the addition of filler powders, one can produce rare-earth containing iron-base resin-bonded magnets that have a good balance of inertia and a magnetic characteristic that match the specific apparatus with which the magnets are to be used. It is particularly interesting to note that the injection molding of pellets that incorporate 13 wt % of a tungsten filler powder having a density of 19.1 g/cm$^3$ or the compression molding of blends with 30 vol % of a tungsten-nickel alloy filler powder (29.3 wt % W and 70.7 wt % Ni) having a density of 10.5 g/cm$^3$ or a tungsten-chromium alloy filler powder (50.4 wt % W and 49.6 wt % Cr) having the same value of density, will produce rare-earth containing iron-base resin-bonded magnets that have a good balance of inertia and a magnetic characteristic that are comparable to those of the existing compression-molded Sm—Co magnets.

If the thus fabricated rare-earth containing iron-base resin-bonded magnet is used as a rotor motor, one can accomplish efficient production of rotors that have a good balance of inertia and a magnetic characteristic that match the specifications of the motor with which those rotors are to be used.

In the bonded magnet thus structured, the electrode potential of an alloy of the Ni—W—M (M: any one of the elements Cr, Mn, Zn, Al) family is set closer to that of the Nd—Fe—B alloy. Therefore, the action of the local battery is weakened in the bonded magnet obtained by mixing the Nd—Fe—B powder and the Ni—W—M alloy powder together, which results in making the bonded magnet less liable to corrosion.

DETAILED DESCRIPTION OF THE PREFERRED EMBODIMENTS

The constitution of the present invention will now be described in detail with reference to the following examples and the associated drawings.

EXAMPLE 1

A magnetic powder consisting of a rare-earth metal neodymium (Nd), iron (Fe) boron (B), and cobalt (Co) was first treated with a silane- or titanate-based coupling agent so that the latter would be deposited on the surfaces of the magnetic particles. The thus treated magnetic powder was mixed with 10 to 60 vol % of tungsten filler powder that had been conditioned in particle size to 48 mesh or finer, or 297 µm or less (JISZ 8801) and which had a density of 19.1 g/cm$^3$. The magnetic powder was also mixed with a very small amount ($\leq$3 wt %) of a lubricant such as oleic acid in a liquid form, calcium stearate, zinc stearate in a powder form, metal soap, metal wax, hydrazine anti-oxidants or the like. Simultaneously with these addition and mixing steps, a thermoplastic resin such as nylon 6 or nylon 12 was added in an amount of 33.5 vol % to the magnetic powder (at this time, metal powder in 53.5 vol % and tungsten filler powder in 13.0 vol %), and it is formed in pellet through a screw mixer. The magnetic powder contains Nd—Fe—B alloy and iron in 77.9 atom %; it was a so-called "quenched Nd—Fe base magnet having a density of 7.6 g/cm$^3$ and comprising particles no greater than 355 µm in size. The mixture was pelletized and processed by a conventional injection molding technique to produce isotropic resin-bonded magnets. The molding densities of these resin-bonded magnets as measured by the Archimedes method, as well as their magnetic flux were as listed in Table 1. The values set forth in Table 1 are each an average for a given number of measurements.

For comparison with the samples prepared in Example 1, a magnet was fabricated by repeating the procedure and formulation of Example 1 except that no filler powder was added (Comparative Example 1). This magnet, as well as a sample of the existing compression molded Sm—Co magnets were measured for density and flux. The existing compression molded Sm—Co magnet is in current use, typically as a motor rotor; the precess of its production consists of preparing an anisotropic sintered magnet from a $Sm_2Co_{17}$ magnetic powder or preparing a cast alloy of said magnetic powder, pulverizing the magnet mechanically or subjecting the cast alloy to a heat treatment until it breaks into small pieces, depositing 13 vol % of a thermosetting resin on the surfaces of the pulverized grains, and compression molding the grains at a pressure of 9 tons/cm².

TABLE 1

| Loading of W filler powder, vol % | Molding density, g/cm³ | Flux, µWb |
| --- | --- | --- |
| 0 (Comp. Ex. 1) | 5.5 | 0.19 |
| 10 | 6.6 | 0.165 |
| 13 | 6.9 | 0.16 |
| 20 | 7.7 | 0.14 |
| 30 | 8.9 | 0.12 |
| 40 | 10.1 | 0.095 |
| 50 | 11.3 | 0.075 |
| 60 | 12.4 | 0.055 |
| Compression molded Sm-Co | 6.9 | 0.16 |

EVALUATION

Figure 1:
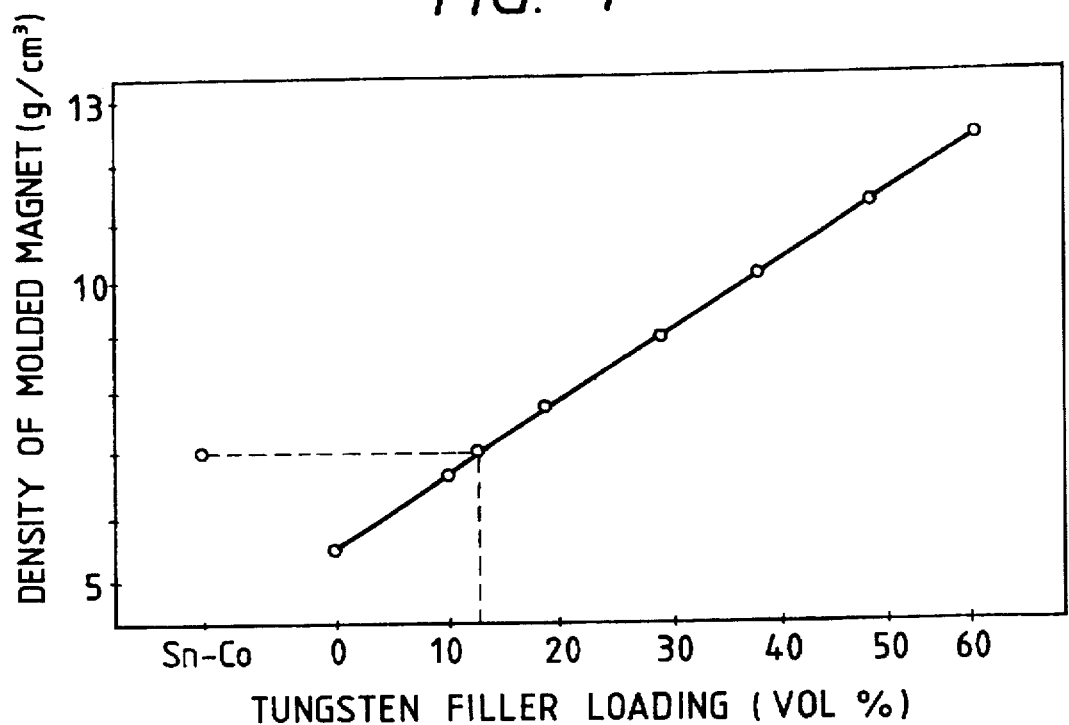
FIG. 1 is a graph showing the molding density vs the loading of a tungsten filler powder in the magnet samples prepared in Example 1 in accordance with the present invention and the sample of Comparative Example 1, with the x-axis plotting the loading of the tungsten (W) filler powder having a density of 19.1 g/cm$^3$ and the y-axis plotting the density of injection molded magnets.
Figure 2:
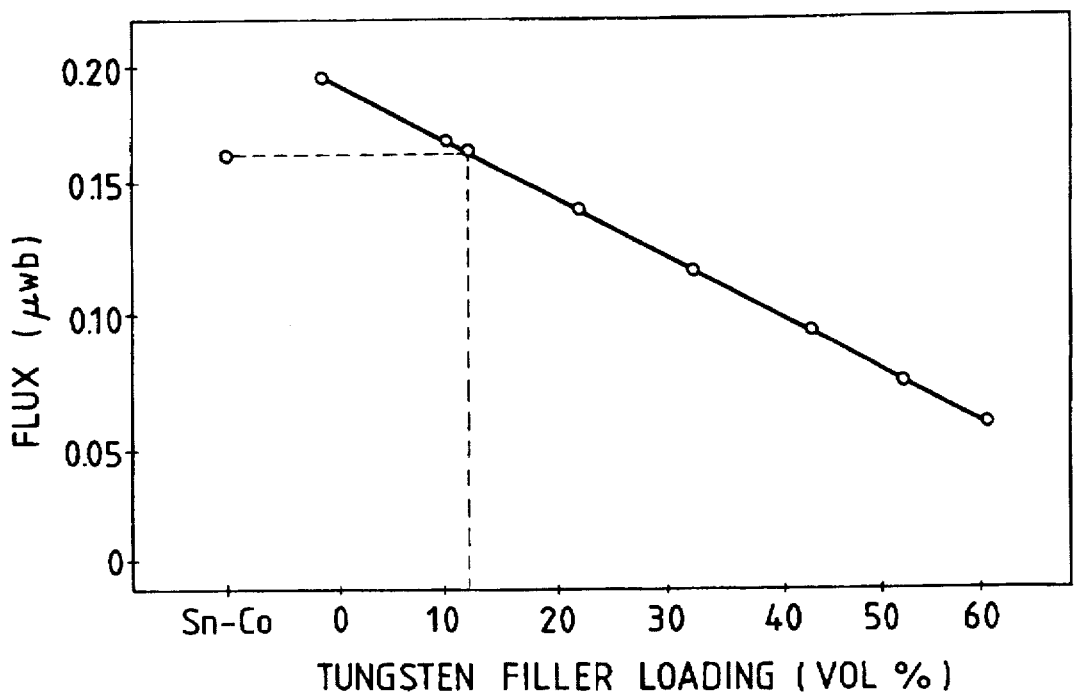
FIG. 2 is a graph showing the magnetic flux vs the loading of a tungsten filler powder in the magnet samples prepared in Example 1 in accordance with the present invention and the sample of Comparative Example 1, with the x-axis plotting the loading of the tungsten (W) filler powder having a density of 19.1 g/cm$^3$ and the y-axis plotting the magnetic flux of injection molded magnets.

The results of Example 1 are shown graphically in FIG. 1 for the densities of the samples molded in accordance with the invention and the sample of Comparative Example 1, and in FIG. 2 for the magnetic flux of each sample. Obviously, the rare-earth containing iron-base resin-bonded magnet prepared by injection molding in the absence of any filler powder had a density of 5.6 g/cm³; as the addition of the tungsten filler powder having a density of 19.1 g/cm³ was increased progressively, the magnet density increased proportionately, reaching 12.4 g/cm³ at 60 vol % loading. The flux was 0.19 µWb in the absence of any filler powder; however, as the addition of the tungsten filler powder having a density of 19.1 g/cm³ was increased progressively, the flux decreased proportionately, becoming as low as 0.055 µWb at 60 vol % loading.

Comparing the filler-free magnet of Comparative Example 1 with the compression molded Sm—Co magnet, one can see that the former had the smaller molding density and the higher flux. However, when the tungsten filler powder having a density of 19.1 g/cm³ was added up to 13 vol %, the molding body density and the flux were comparable to those of the compression molded Sm—Co magnet. Thus, even the process of injection molding using thermoplastic resins that are generally held to defy the effort toward higher densities can successfully produce rare-earth containing iron-base resin-bonded magnets having higher specific densities; this means a potential transition from the existing compression molded Sm—Co magnets to rare-earth containing iron-base resin-bonded magnets.

When the tungsten filler powder was added in amounts beyond 13 wt %, the molding body density became higher and the flux became smaller than the compression molded Sm—Co magnet.

Thus, the gradual increase in the addition of the filler powder is accompanied by the proportionate increase in density but the flux decreases proportionately; hence, a magnet having desired values of density and flux can be manufactured efficiently. Since the two parameters are variable over broad ranges, magnets meeting versatile requirements can be fabricated. Furthermore, the injection molding process offers the advantage of producing more complex shapes and smaller thicknesses than compression and other molding techniques.

EXAMPLE 2

Figure 3:
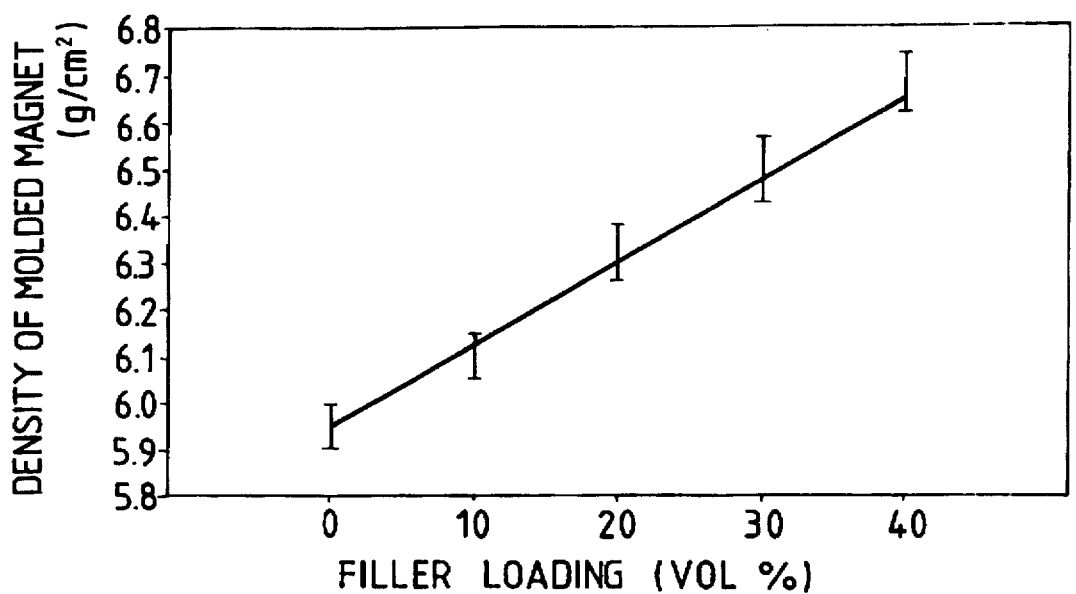
FIG. 3 is a graph showing the molding density vs the loading of a copper filler powder in the magnet samples prepared in Example 2 in accordance with the present invention and the sample of Comparative Example 2, with the x-axis plotting the loading of the copper (Cu) filler powder having a density of 8.9 g/cm$^3$ and the y-axis plotting the density of compression molded magnets.
Figure 4:
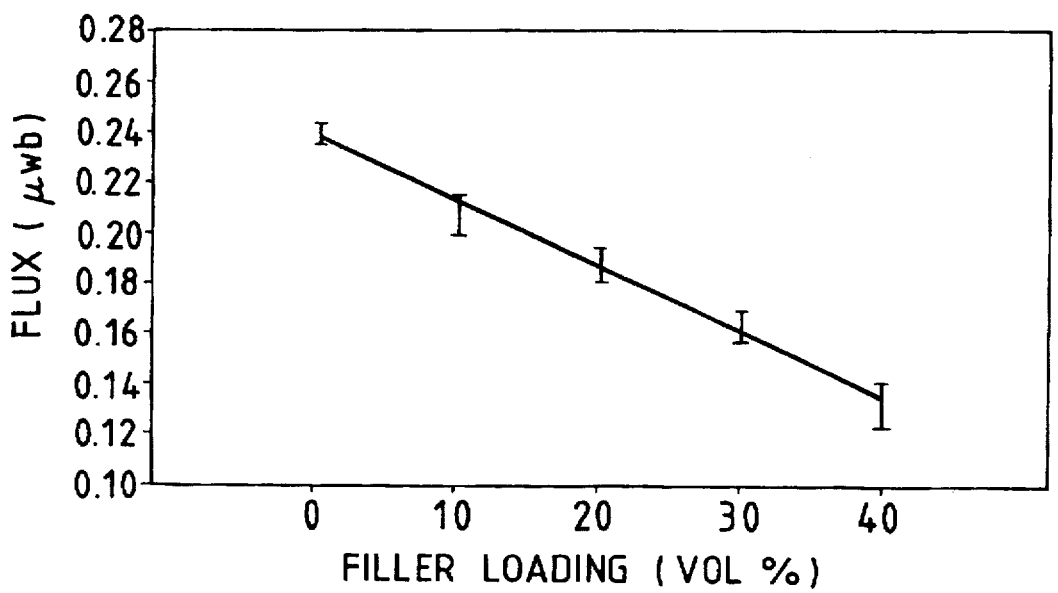
FIG. 4 is a graph showing the magnetic flux vs the loading of a copper filler powder in the magnet samples prepared in Example 2 in accordance with the present invention and the sample of Comparative Example 2, with the x-axis plotting the loading of the copper (Cu) filler powder having a density of 8.9 g/cm$^3$ and the y-axis plotting the magnetic flux of compression molded magnets.

A copper filler powder finer than 48 mesh (density=8.9 g.cm³) and a Nd (neodymium)—Fe'B magnetic powder also finer than 48 mesh (77 atom %; Fe; density=7.6 g/cm³) were mixed at varying ratios. The mixtures were coated with 12 vol % of a thermosetting resin and compression molded at a pressure of 9 tons/cm² to produce magnets. The magnet's density vs the weight ratio at which the Nd—F—B magnetic powder was mixed with the copper filler powder is shown in FIG. 3, and the magnetic characteristic (flux) vs the mixing ratio is shown in FIG. 4. Obviously, the magnetic characteristic decreased in proportion as the filler addition increased but the density changed in opposite way.

The data from which FIGS. 3 and 4 were constructed, as well as the data of the magnet of Comparative Example 2 which only differed from the samples of Example 2 in that no filler powder was added are shown in Table 2.

TABLE 2

| Loading of Cu filler powder, vol % | Molding density, g/cm³ | Flux, µWb |
| --- | --- | --- |
| 0 (Comp. Ex. 2) | 5.9–6.0 | 0.236–0.244 |
| 10 | 6.04–6.15 | 0.20–0.216 |
| 20 | 5.25–6.38 | 0.183–0.195 |
| 30 | 6.42–6.57 | 0.16–0.172 |
| 40 | 6.62–6.74 | 0.125–0.142 |

EVALUATION

The results of Example 2 are shown graphically in FIG. 3 for the densities of the samples molded in accordance with the invention and the sample of Comparative Example 2, and in FIG. 4 for the magnetic flux of each sample. Obviously, the rare-earth containing iron-base resin-bonded magnet prepared by compression molding in the absence of any filler powder had a density between 5.9 and 6.0 g/cm³; as the addition of the copper filler powder was increased progressively, the magnet density increased proportionately, reaching between 6.62 and 6.74 g/cm³ at 40 vol % loading. The flux was between 0.235 and 0.245 µWb in the absence of any filler powder; however, as the addition of the copper filler powder was increased progressively, the flux decreased proportionately, becoming as low as between 0.125 and 0.142 µWb at 40 vol % loading.

Thus, the gradual increase in the addition of the filler powder is accompanied by the proportionate increase in density but the flux decreases proportionately; hence, a magnet having desired values of density and flux can be manufactured efficiently. Since the two parameters are variable over broad ranges, magnets meeting versatile requirements can be fabricated. Furthermore, the compression molding process offers the advantage of producing magnets of high performance, high compression characteristic, and high radial crushing strength constant, and high tolerances more easily than other molding techniques.

EXAMPLE 3

Figure 5:
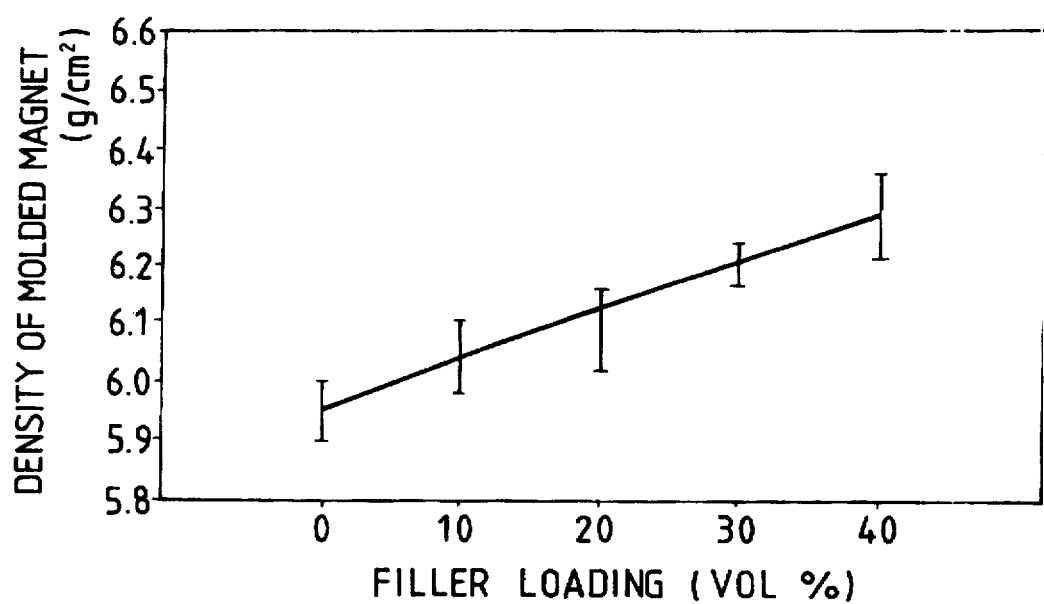
FIG. 5 is a graph showing the molding density vs the loading of an iron filler powder in the manner samples prepared in Example 3 in accordance with the present invention and the sample of Comparative Example 2, with the x-axis plotting the loading of the iron (Fe) filler powder having a density of 7.9 g/cm$^3$ and the y-axis plotting the density of compression molded magnets.
Figure 6:
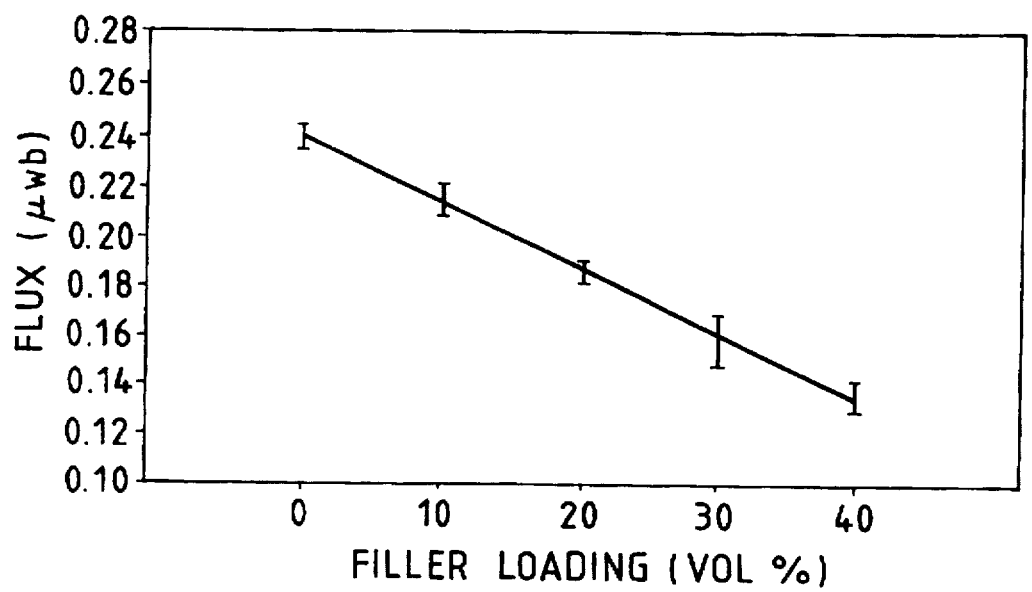
FIG. 6 is a graph showing the magnetic flux vs the loading of an iron filler powder in the magnet samples prepared in Example 3 in accordance with the present invention and the sample of Comparative Example 2, with the x-axis plotting the loading of the iron (Fe) filler powder having a density of 7.9 g/cm$^3$ and the y-axis plotting the magnetic flux of compression molded magnets.

An iron filler powder finer than 48 mesh (density=7.9 g/cm₃) and a Nd (neodymium)—Fe—B magnetic powder (77 atom % Fe; density=7.6 g/cm³) also finer than 48 mesh were mixed at varying ratios. The mixtures were coated or mixed with 12 vol % of a thermosetting resin and compression molded at a pressure of 9 tons/cm³. The magnet's density vs the weight ratio at which the Nd—Fe—B magnetic powder was mixed with the iron filler powder is shown in FIG. 5, and the magnetic characteristic (flux) vs the mixing ratio is shown in FIG. 6. Obviously, the magnetic characteristic decreased in proportion as the filler addition increased but the density changed in opposite way.

The data from which FIGS. 5 and 6 were constructed, as well as the data of the magnet of Comparative Example 2 are also shown in Table 3.

TABLE 3

| Loading of Fe filler powder, vol % | Molding density, g/cm³ | Flux, μWb |
| --- | --- | --- |
| 0 (Comp. Ex. 2) | 5.9–6.0 | 0.236–0.244 |
| 10 | 5.98–6.1 | 0.21–0.223 |
| 20 | 6.02–6.16 | 0.182–0.192 |
| 30 | 6.16–6.24 | 0.146–0.168 |
| 40 | 6.21–6.36 | 0.13–0.142 |

EVALUATION

The results of Example 3 are shown graphically in FIG. 5 for the densities of the samples molded in accordance with the invention and the sample of Comparative Example 2, and in FIG. 6 for the magnetic flux of each sample. Obviously, the rare-earth containing iron-base resin-bonded magnet prepared by compression molding in the absence of any filler powder had a density between 5.9 and 6.0 g/cm³; as the addition of the iron filler powder was increased progressively, the magnet density increased proportionately, reaching between 6.2 and 6.36 g/cm³ at 40 vol % loading. The flux was between 0.235 and 0.245 μWb in the absence of any filler powder; however, as the addition of the iron filler powder was increased progressively, the flux decreased proportionately, becoming as low as between 0.13 and 0.142 μWb at 40 vol % loading.

Thus, the gradual increase in the addition of the filler powder is accompanied by the proportionate increase in density but the flux decreases proportionately; hence, a magnet having desired values of density and flux can be manufactured efficiently. Since the two parameters are variable over broad ranges, magnets meeting versatile requirements can be fabricated. Furthermore, the compression molding process offers the advantage of producing magnets of high performance, high compression characteristic, and high radial crushing strength constant, and high tolerances more easily than other molding techniques.

EXAMPLE 4

A tungsten-nickel alloy filler powder (29.3 wt % W and 70.7 wt % Ni) that had been conditioned to a particle size finer than 48 mesh and which had a density of 10.5 g/cm³ and a Nd—Fe—B magnetic powder also finer than 48 mesh (77 at % Fe; density=7.6 g/cm³) were mixed at varying ratios. The mixtures were coated or mixed with 12 vol % of a thermosetting resin and compression molded at a pressure of 9 tons/cm². The magnet's density vs the volume ratio of filler addition is shown in FIG. 7, and the magnetic characteristic (flux) vs the filler addition is shown in FIG. 8.

For comparison with the samples prepared in Example 4, the sample of Comparative Example 2 and a sample of the existing compression molded Sm—Co magnets were measured for density and flux. The existing compression molded Sm—Co magnet is in current use, typically as a motor rotor; the process of its production consists of preparing an anisotropic sintered magnet from a $Sm_2Co_{17}$ magnetic powder or preparing a cast alloy of said magnetic powder, pulverizing the magnet mechanically or subjecting the cast alloy to a heat treatment until it breaks into small pieces, depositing 13 vol % of a thermosetting resin on the surfaces of the pulverized grains, and compression molding the grains at a pressure of 9 tons/cm².

Figure 7:
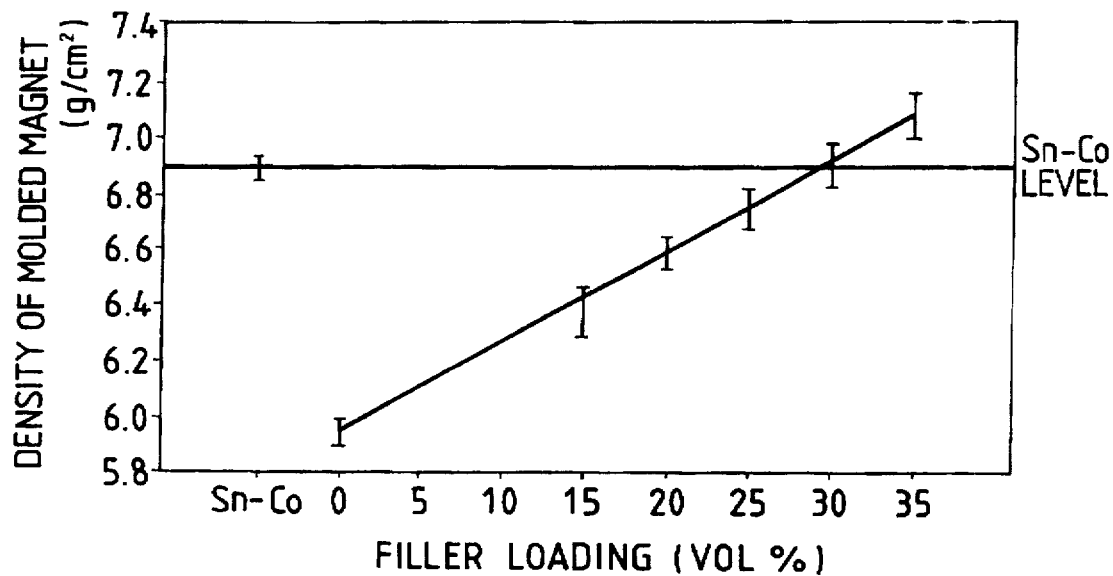
FIG. 7 is a graph showing the molding density vs the loading of a tungsten-nickel alloy filler powder in the magnet samples prepared in Example 4 in accordance with the present invention and the sample of Comparative Example 2, with the x-axis plotting the loading of the tungsten-nickel (W—Ni) alloy filler powder having a density of 10.5 g/cm$^3$ and the y-axis plotting the density of injection molded magnets.
Figure 8:
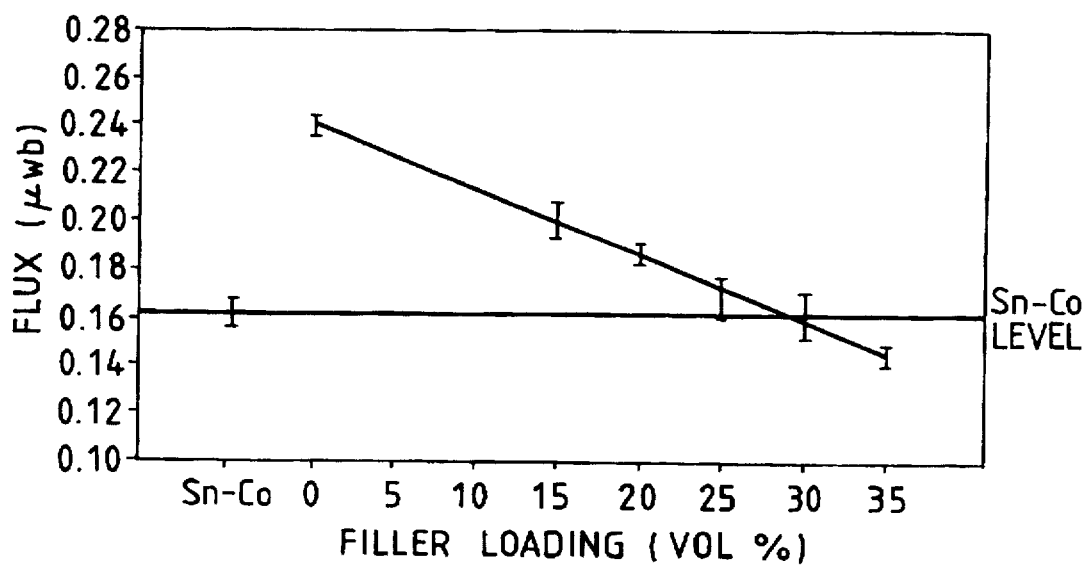
FIG. 8 is a graph showing the magnetic flux vs the loading of a tungsten-nickel alloy filler powder in the magnet samples prepared in Example 4 in accordance with the present invention and the sample of Comparative Example 2, with the x-axis plotting the loading of the tungsten-nickel (W—Ni) filler powder having a density of 10.5 g/cm$^3$ and the y-axis plotting the magnetic flux of injection molded magnets.

The data from which FIGS. 7 and 8 were constructed, as well as the data of the magnet of Comparative Example 2 are shown in Table 4.

TABLE 4

| Loading of W-Ni filler powder, vol % | Molding density, g/cm³ | Flux, μWb |
| --- | --- | --- |
| 0 (Comp. Ex. 2) | 5.9–6.0 | 0.236–0.244 |
| 15 | 6.28–6.46 | 0.195–0.209 |
| 20 | 6.52–6.64 | 0.163–0.192 |
| 25 | 6.67–6.92 | 0.16–0.176 |
| 30 | 6.81–6.98 | 0.152–0.17 |
| 35 | 7.0–7.15 | 0.14–0.15 |
| Compression molded Sm-Co | 6.85–6.95 | 0.156–0.168 |

EVALUATION

The results of Example 4 are shown graphically in FIG. 7 for the densities of the samples molded in accordance with the invention and the sample of Comparative Example 2, and in FIG. 8 for the magnetic flux of each sample. Obviously, the rare-earth containing iron-base resin-bonded magnet prepared by compression molding in the absence of any filler powder had a density between 5.9 and 6.0 g/cm³; as the addition of the tungsten-nickel alloy filler powder was increased progressively, the magnet density increased proportionately, reaching between 7.0 and 7.15 g/cm³ at 35 vol % loading. The flux was between 0.236 and 0.244 μWb in the absence of any filler powder; however, as the addition of the tungsten-nickel alloy filler powder was increased progressively, the flux decreased proportionately, becoming as low as between 0.14 and 0.15 μWb at 35 vol % loading.

Comparing the filler-free magnet of Comparative Example 2 with the compression molded Sm—Co magnet, one can see that the former had the higher molding density (specific gravity) and the higher flux. However, when the W—Ni alloy filler powder having a density of 10.5 g/cm³ was added up to 30 vol % and the mixture (containing 58 vol % magnetic powder and 12 vol % thermosetting resin) was compression molded, the molding density (specific gravity) and the flux were comparable to those of the compression molded Sm—Co magnet. This means that the expansive Sm—Co magnet which uses one of the rarest metals Sm as the principal component can potentially be replaced by the inexpensive Nd—Fe—B magnetic powder which uses Fe as the principal component. Furthermore, the compression molding process offers the advantage of producing magnets of high performance, high compression characteristic, and high radial crushing strength constant, and high tolerances more easily than other molding techniques.

EXAMPLE 5

A tungsten-chromium alloy filler powder (50.4 wt % W and 49.6 wt % Cr) that had been conditioned to a particle size finer than 48 mesh and which had a density of 10.5 g/cm$^3$ and a Nd—Fe—B magnetic powder also finer than 48 mesh (77.8 atom % Fe; density=7.6 g/cm$^3$) were mixed at varying ratios. The mixtures were coated and mixed with 12 vol % of a thermosetting resin and compression molded at a pressure of 9 tons/cm$^2$. The profiles of magnet's density and its magnetic characteristic (flux) vs the volume ratio of filler addition were each the same as in Example 4.

While the foregoing examples are preferred embodiments of the present invention, it should be understood that the invention is by no means limited to those examples and that various modifications can be implemented without departing from the scope and spirit of the invention. For instance, not only Nd-containing magnetic powders but also Pr-containing magnetic powders have satisfactory magnetic characteristics as rare-earth metal containing magnetic powders and they produce as good results as in the foregoing examples. Equally high magnetic characteristics are attainable with magnetic powders that contain other rare earth metals such as Y, La, Sm and Lu. A suitable rare-earth metal containing magnetic powder may be selected depending on the specific use.

The filler powders used in the examples are based on W, Ni, Cu, Fe and Cr which are produced commercially and hence are available at fairly low cost. Other filler materials that may be used include Co, Si, C, Mn, Mo, Ti, Zn, Pb, Sn, Al and P which are also produced commercially and hence are available at fairly low cost. One or more of these filler materials are formulated to give suitable densities or specific gravities, alloyed by various methods including rapid quenching, atomization, mechanical alloying, casting and various powder metallurgical procedures, and conditioned for a suitable particle size; alternatively, filler powders such as W, Ni, Co, Cu, Fe, Cr, Si, C, Mn, Mo, Ti, Zn, Pb, Sn, Al and P are mixed as such without being alloyed or those filler materials are subjected to powder plating or otherwise treated to prepare powders having suitable densities or specific gravities, followed by conditioning for a suitable particle size.

If fillers are prepared by alloying as in the examples, greater filler uniformity can be assured than when powders alone are mixed and this permits the fillers to be mixed with the magnetic powder more easily. It should, however, be noted that fillers can be prepared by mixing the powders alone. The fillers are in no way limited to tungsten and may include other metals such as Ni, Co, Cu, Fe, Cr, Si, C, Mn, Mo, Ti, Zn, Pb, Sn, Al and P as well as non-metals such as ceramics including glass.

Aside from injection and compression molding techniques, extrusion molding may also be adopted to shape magnets. The binder to be used in the case of effecting extrusion molding is typically selected from among thermoplastic resins such as nylon 6 and nylon 12. The mixture is kneaded at a temperature of 230° to 280° C. to prepare a magnet pellet, which is shaped with a screw-type or some other extrusion molding machine. If a hydrazine-containing antioxidant is incorporated as a lubricant in an amount of about 2 wt % (7 vol %), the kneading torque and the viscosity of the pellet can be suppressed from increasing excessively and the screw load is sufficiently stabilized to enable continuous molding operations. Compared to other molding processes, extrusion molding is advantageous for its ability to produce smaller thicknesses and greater lengths. Furthermore, extrusion molding which can be performed continuously features higher productivity than other molding techniques. It should also be added that unlike the magnets shaped by injection molding, those which are shaped by extrusion molding have no resin layer formed on the surface.

The fillers will be equally effective without addition of lubricants such as oleic acid in a liquid form, calcium stearate, zinc stearate in a powder form, metal soap, metal wax, hydrazine anti-oxidants or the like. Stated more specifically, even in the absence of lubricants, the incorporation of fillers will contribute to a higher density and a lower magnetic characteristic. It should also be noted that the use of coupling agents may be omitted if thermosetting resins that can adhere to metals are used as binders. The particle size of filler powder may be shaped in 500 µm or less (JISZ8801, 32 mesh or finer).

EXAMPLE 6

The magnetic powders need not be produced by quenching but by hydrogen occlusion or powder metallurgy. The magnetic powders may have particle sizes exceeding 355 µm. The concept of the present invention may be applicable not only to isotropic resin-bonded magnets but also to radial or otherwise anisotropic resin-bonded magnets.

Figure 9:
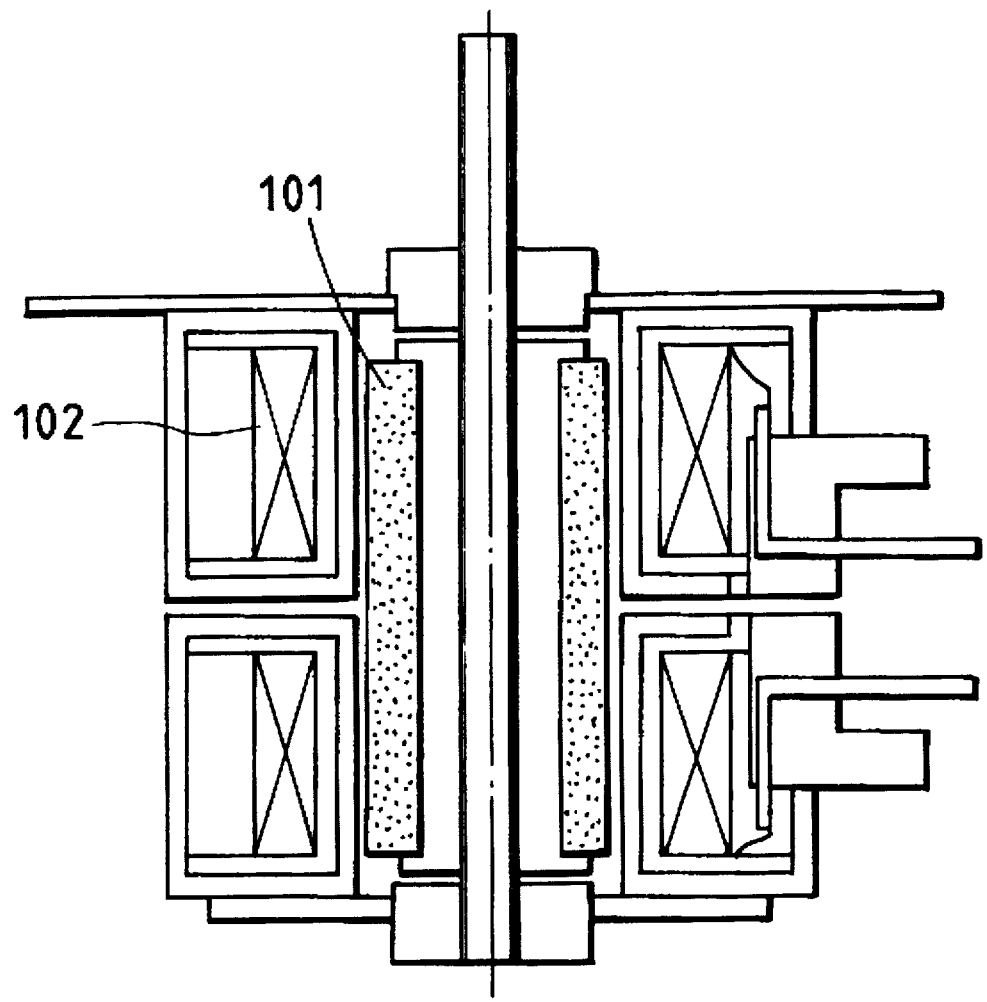
FIG. 9 is a longitudinal section of a PM stepping motor in the rotor of which the rare-earth containing iron-base resin-bonded magnets fabricated in Examples 1 to 5 were mounted.

The rare-earth containing iron-base resin-bonded magnets fabricated in Examples 1 to 5 were each used with the rotor of a motor. By so doing, rotors having a good balance of inertia and magnetic characteristic that matched the specifications of the motor could be produced efficiently. The motor was a PM stepping motor which, as shown in FIG. 9, used as the rotor a permanent magnet magnetized for multi-poles. The stator consisted of triangular teeth excitable by coils wound about in a peripheral direction. The flux flowing out of the teeth to pass through the gap would interact with the permanent magnet to produce a torque. If desired, the rare-earth containing iron-base resin-bonded magnet of the invention may be adopted not as the rotor of motor but as a magnet on the stator side. Aside from motors, the magnet of the invention may also be used with speakers and various other machines or instruments.

As will be apparent from the foregoing description, the rare-earth containing iron-base resin-bonded magnet of the present invention is molded from an iron-based magnetic powder that contains a rare earth metal such as Nd or Pr and with which a filler powder, a thermoplastic or thermosetting resin and an additive have been mixed. By adjusting the proportion in which the iron-base magnetic powder is mixed with the filler powder, the density (specific gravity) and a magnetic characteristic of the magnet can be varied proportionately. As a consequence, the invention permits effective production of rare-earth containing iron-base resin-bonded magnets that have a good balance of inertia and a magnetic characteristic that match the specific apparatus with which the magnets are to be used.

The range over which the mixing proportion of the filler powder is variable includes points where compositions occur that have the same inertia and magnetic characteristic as those of compression molded Sm-Co magnets which use as principal components the two scarce and expensive elements Sm (samarium) and Co (cobalt). Hence, by proper selection of the filler powder and the amount of its addition, inexpensive rare-earth containing iron-base resin-bonded magnets can be used as substitutes for the expensive compression molded Sm-Co magnets.

As a further advantage, if the rare-earth containing iron-base resin-bonded magnet is used as a rotor motor, one can accomplish efficient production of rotors that have a good balance of inertia and a magnetic characteristic that match the specifications of the motor with which those rotors are to be used.

W which is industrially mass-produced, relatively inexpensive and readily available, Ni or Co, Fe were mixed together and the mixture with 25–45 wt % W in a weight ratio was placed in a high-frequency melting furnace before being melted into an alloy. Then the ultra-quick cooling, atomizing and casting methods were used to reduce the alloy to powder. Further, the W alloy filler whose mean grain size had been adjusted to not smaller than 30 µm magnetic powder of the Nd-Fe-B or Pr-Fe-B family with Fe as main raw material, produced by the ultra-quick cooling and hydrogen occlusion methods, were mixed together in such a manner as to make the mixture contain a 20–50 wt % filler and as a binder, 1–3 wt % thermosetting resin (epoxy series, phenol series) was subsequently deposited thereon. Then thermosetting resin was deposited on the filler and the magnetic powder of the Nd-Fe-B family separately, and the filler and the magnetic powder were mixed together at the same mixture ratio. The mixture thus produced was then compression-molded at a molding pressure of 5–10 t/cm² before being thermoset to obtain a magnet.

A filler having a mean grain size of not smaller than 30 µm that stable fluidity in compression molding and the density of a molded product (magnet) are secured and a resin mixture ratio of 1–3 wt % also makes it possible to secure the strength of the molded product as compression molding can be carried out.

With a filler mixture ratio of 20–50 wt %, moreover, a magnet of this sort can satisfy the magnetic characteristics actually required.

Incidentally, the magnet produced by adding the 20–50 wt % filler used to alloy W with Ni, Co, Fe and compression molding satisfies the magnetic characteristics required with $(BH)_{MAX}$ at 2–7 MGOe and molding density at 6.3–7.5 g/cm³.

Figure 10:
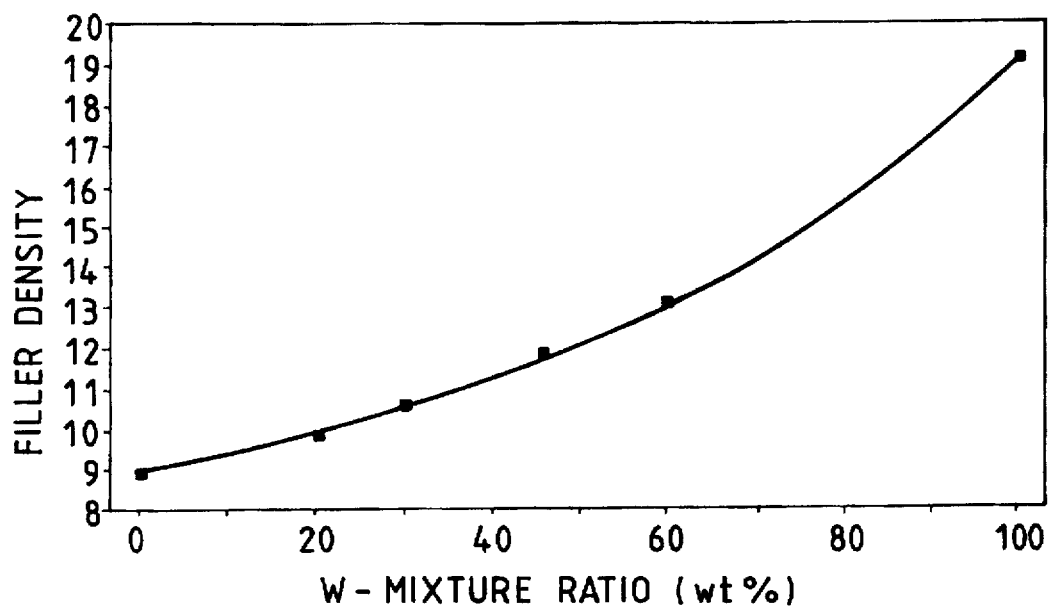
FIG. 10 is a graphic representation showing the relation between the compounding ratio and specific gravity of the filler with W, Ni as constituents.

The specific gravity of a filler varies with the compounding ratio. FIG. 10 shows the relation between the compounding ratio and specific gravity of the filler with W, Ni as constituents. If W is compounded in excess of 45 wt % in a case where it is alloyed, the melting point and the viscosity of the molten alloy will sharply rise and this makes it hardly possible to industrially manufacture stable fillers. Moreover, the alloyed condition will appear in a plurality of layers, thus making the alloy inhomogeneous. Whereas if 25 wt % or less W is compounded, the specific gravity of the filler will lower and the intended specific gravity of the magnet (with satisfactory magnetic characteristics required) will not be satisfied.

Figure 11:
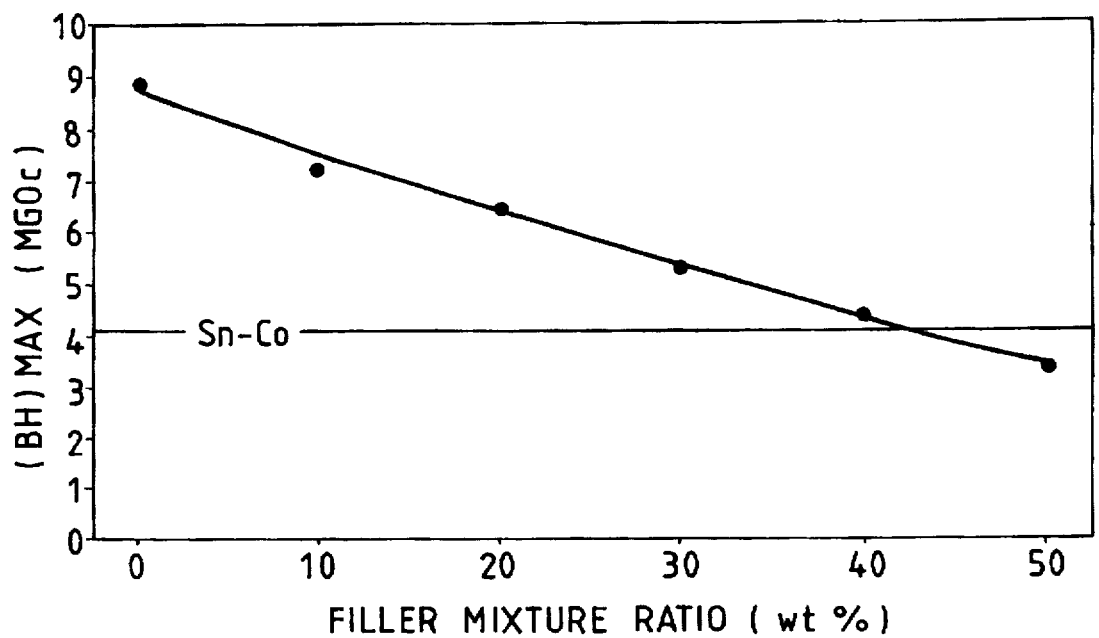
FIG. 11 is a graphic representation showing the relation between magnetic characteristics and filler loads when a W—Ni alloy powder filler having a specific gravity of 11.0.

FIG. 11 shows the relation between magnetic characteristics and filler loads when a W.Ni alloy powder filler having a specific gravity of 11.0. The magnetic characteristics lower in proportion to the loads and will become lower in proportion if the specific gravity of the filler is lowered, though not shown.

EXAMPLE 7

Figure 12:
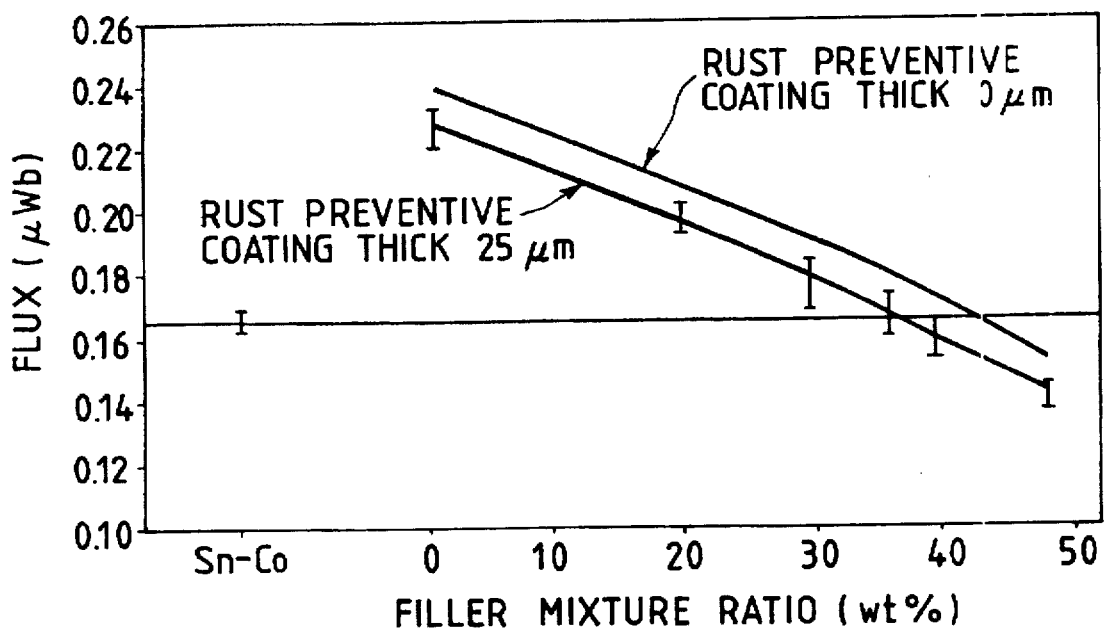
FIG. 12 is a graphic representation showing the relation between the filler loads (in a weight ratio) of a magnet and a flux amount.
Figure 13:
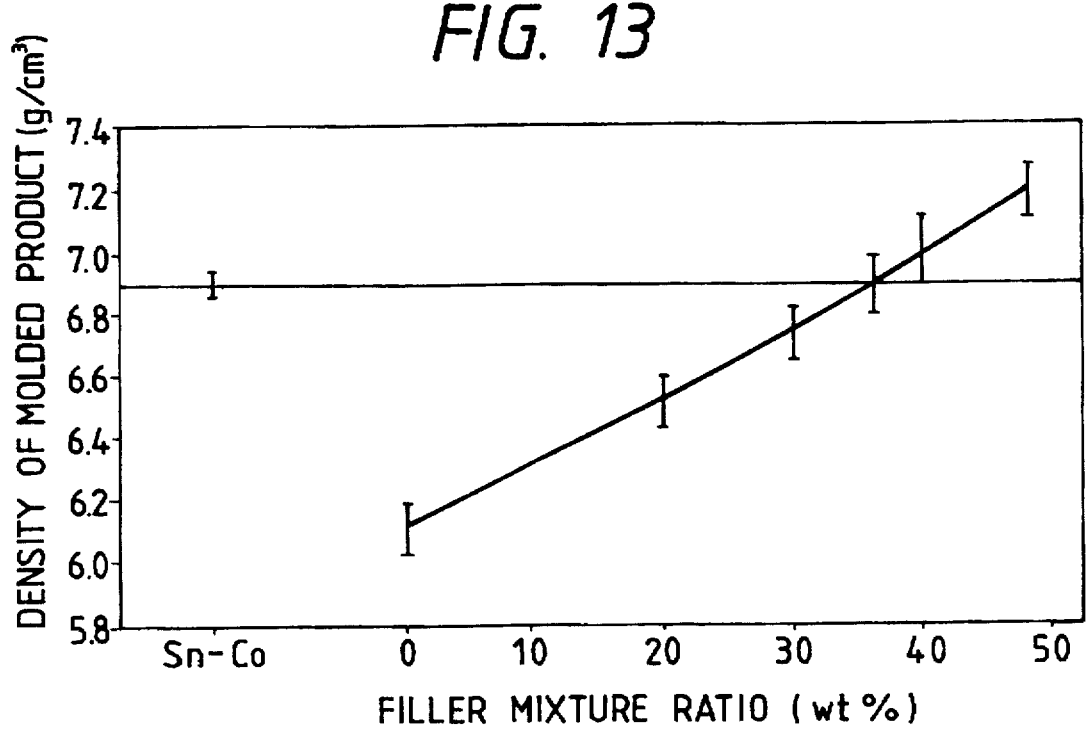
FIG. 13 is a graphic representation showing the relation between the filler loads (in a weight ratio) and the specific gravity of the magnet (the density of the molded product)

FIG. 12 shows the relation between the filler loads (in a weight ratio) of a magnet and a flux amount. The magnet was compression-molded at a molding pressure of 9 t/cm² under the following conditions: with a rust preventive coating 25 µm thick, a W.Ni alloy powder filler (W: 36 wt %, Ni: 64 wt %) whose mean grain size had been adjusted to 100 µm and which had a specific gravity of 11.0 and magnetic powder of the Nd-Fe-B family (containing 77 wt % Fe, specific gravity of 7.6) whose means grain size was 150 µm were used while an amount of thermosetting resin deposit was set to 2 wt %. FIG. 13 shows the relation between the filler loads and the specific gravity of the magnet (the density of the molded product). FIG. 12 refers to values when the magnet was used for the rotor of a stepping motor and also shows the relation between filler loads (in a weight ratio) and a flux amount without the use of such a rust preventive coating for the purpose of comparison.

A Sm-Co magnet shown as a comparative example was prepared by depositing 2 wt % thermosetting resin on the ground product of an anisotropic sintered magnet containing magnetic powder of the Sm2 Co17 family, and compression-molding the above combination at a molding pressure of 9 t/cm². Such a magnet is used as, for example, the rotor of a motor now. Although the magnetic characteristics lower when the filler mixture ratio is raised, a magnet having greater specific gravity is obtained and when the magnet is used as the rotor, the rotation of the motor is stabilized so that it can comply with the demanding relation between magnetic characteristics and specific gravity, depending on the use.

On the other hand, a magnet having magnetic characteristics and specific gravity similar to those of the Sm-Co magnet is attainable by mixing magnetic powder of the Nd-Fe-B family and a 36 wt % W.Ni alloy filler in a weight ratio having a specific gravity of 11.0 together, and molding the mixture. Consequently, the magnet using magnetic powder of the Nd-Fe-B family containing Fe as main raw material may be substituted for the expensive Sm-Co magnet containing Sm which is very rare among rare earths.

EXAMPLE 8

Figure 14:
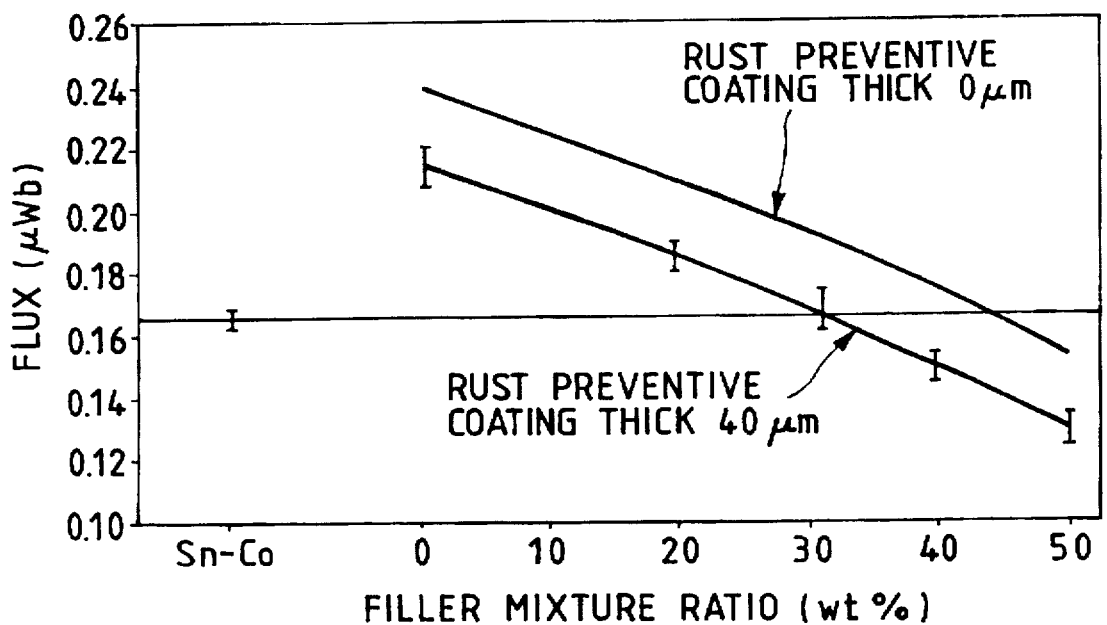
FIG. 14 is a graphic representation showing the relation between the filler loads (in a weight ratio) of a magnet and a flux amount.
Figure 15:
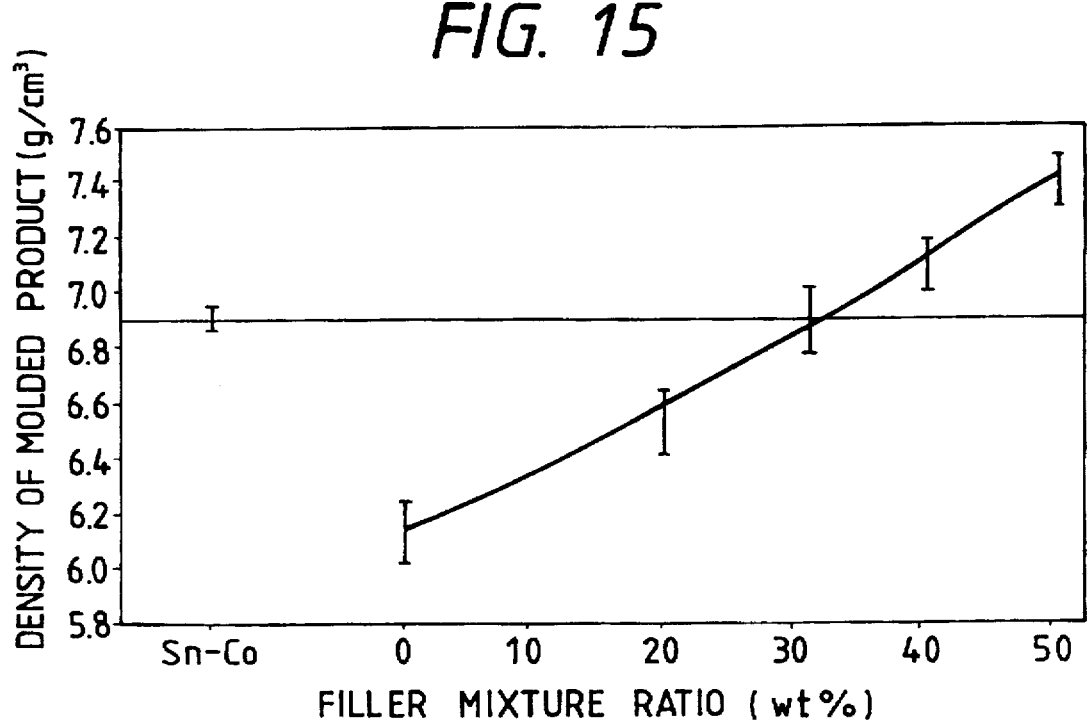
FIG. 15 is a graphic representation showing the relation between the filler loads (in a weight ratio) and the specific gravity of the magnet (the density of the molded product).

FIG. 14 shows the relation between the filler loads (in a weight ratio) of a magnet and a flux amount. The magnet was compression-molded at a molding pressure of 9 t/cm² under the following conditions: with a rust preventive coating 40 µm thick, a W.Ni alloy powder filler (W: 45 wt %, Ni: 55 wt %) whose mean grain size had been adjusted to 100 µm and which had a specific gravity of 11.7 and magnetic powder of the Nd-Fe-B family (containing 77 wt % Fe, specific gravity of 7.6) whose means grain size was 150 µm were used while an amount of thermosetting resin deposit was set to 2 wt %. FIG. 15 shows the relation between the filler loads and the specific gravity of the magnet (the density of the molded product). FIG. 14 refers to values when the magnet was used for the rotor of a stepping motor and also shows the relation between filler loads (in a weight ratio) and a flux amount without the use of such a rust preventive coating for the purpose of comparison.

A Sm-Co magnet shown as a comparative example was prepared by depositing 2 wt % thermosetting resin on the ground product of an anisotropic sintered magnet containing magnetic powder of the Sm2 Co17 family, and compression-molding the above combination at a molding pressure of 9 t/cm². Such a magnet is used as, for example, the rotor of a motor now. Although the magnetic characteristics lower when the filler mixture ratio is raised, a magnet having greater specific gravity is obtained and when the magnet is used as the rotor, the rotation of the motor is stabilized so that it can comply with the demanding relation between magnetic characteristics and specific gravity, depending on the use.

On the other hand, a magnet having magnetic characteristics and specific gravity similar to those of the Sm-Co magnet is attainable by mixing magnetic powder of the Nd-Fe-B family and a 31 wt % W.Ni alloy filler in a weight ratio having a specific gravity of 11.7 together, and molding the mixture. Consequently, the magnet using magnetic powder of the Nd-Fe-B family containing Fe as main raw material may be substituted for the expensive Sm-Co magnet containing Sm which is very rare among rare earths.

MODIFIED EMBODIMENT

Although magnetic powder of the Nd family was used as magnetic powder of rare earths in the embodiment above, magnetic powder of the Pr family has also excellent magnetic characteristics and is therefore entitled to attain the same effect as stated above. Any other magnet of rare earths offering good magnetic characteristics is used likewise.

According to the seventh and eighth of the present invention, the rare earths-ion resin-bonded magnet is produced by mixing magnetic powder of the iron family containing rare earths such as Nd or Pr, for example, W alloy filler powder having specific gravity greater than that of the magnetic powder of the ion family, thermosetting resin and a small amount of additive together; and compression-molding the mixture. Further, 1–3 wt % resin, a 20–50 w % filler and magnetic powder as the remainder in a weight ratio are mixed together and the filler has a means grain size of not smaller than 30 µm. Therefore, compression-molding is readily carried out. Further, the filler is an alloy of W and Ni and Co or Fe, and 25–45 w % W in a weight ratio is added, so that a homogenous alloy filler having greater specific gravity is obtained. The introduction of such a filler into the magnetic powder of the iron family makes available a magnet which is free from deflection in the specific gravity thereof and has greater specific gravity.

The filler is an alloy of W and Ni, 36 wt % W and the 36 wt % filler in a weight ratio being added, and the rust preventive resin coating is applied to the inner or outer periphery of the magnet. Consequently, a magnet obtainable is equal to the Sm-Co magnet widely in use now and what has magnetic characteristics and specific gravity set in line with apparatus for use is also obtainable under the combination of conditions above.

It is therefore possible to obtain a magnet which is equivalent to the Sm-Co magnet containing Sm and Co which are very rare and expensive as main raw material or capable of meeting the requirements of magnetic characteristics and specific gravity by using what uses the Nd-Fe-B magnet containing Fe as main raw material.

EXAMPLE 9

Example (Compounding: Wt %)

A material containing 30% Nd, 1.6% B and 68.4% Fe was melted in a furnace before being discharged onto a water-cooled steel roll. The quick cooling method was used to obtain ribbon-like, thin belt-like powder, which was then ground and mixed with an organic solvent and 2.0% uncured epoxy resin powder. Further, Ni-W-Cr alloy powder (69:36:5 in a weight ratio) was added to the mixture to be kneaded. The kneaded product was put into a mold and compression-molded (4.5 tons/cm$^2$) by a press and further subjected to heat-curing (100°–180° C.×1 hr). A finished bonded magnet was thus produced.

Comparative Example

In the example above, only Ni-W alloy powder (64:36 in a weight ratio) was added and a finished bonded magnet was obtained in the same way.

The measuring means below was used to measure the electrode potential of the bonded magnets in the example and the comparative example. Table 1 below shows the results obtained thereby.

Measuring instrument: potentiostat
Reference electrode: calomel electrode
Test solution: 0.1M in KCl

TABLE 5

| Test piece | Substance | Electrode potential difference | Potential difference with Nd-Fe-B (V) |
|---|---|---|---|
| Conventional Example | Nd-Fe-W | 0.61 | — |
| Invention | Ni-W-Cr | 0.47 | 0.14 |
| Comparative Example | Ni-W | 0.38 | 0.23 |

According to the ninth example of the present invention, as set forth above in detail, one of the elements Cr, Mn, Zn and Al in addition to Ni-W mixed powder is added to rare earth metal to produce the bonded magnet so as to weaken the action of the electrode battery thereby. Consequently, the bonded magnet is made corrosion-resistant.

What is claimed is:

1. A method for manufacturing a rare-earth containing iron-base resin-bonded magnet, comprising the step of:

preparing a first mix of an iron-base magnetic powder that contains a rare earth metal selected from the group consisting of neodymium and praseodymium with a filler powder;

preparing a second mix of a resin including one of thermoplastic resin and thermosetting resin and an additive; and forming a predetermined shape by molding said first and second mixes, wherein the filler powder contains at least one element selected from the group consisting of tungsten, nickel, cobalt, copper, iron, chromium, silicon, carbon manganese, molybdenum, titanium, zinc, lead, tin, and aluminum.

2. A method for manufacturing a rare-earth containing iron-base resin-bonded magnet according to claim 1 wherein the rare-earth containing iron base resin-bonded magnet is formed by injection molding.

3. A method for manufacturing a rare-earth containing iron-base resin-bonded magnet according to claim 1 wherein the rare-earth containing iron-base resin-bonded magnet is formed by compression molding.

4. A method for manufacturing a rare-earth containing iron-base resin-bonded magnet according to claim 1 wherein the rare-earth containing iron-base resin-bonded magnet is formed by extrusion molding.

5. A rare-earth containing iron-base resin-bonded magnet consisting essentially of:

an iron-base magnetic powder that contains a rare earth metal selected from the group consisting of neodymium and praseodymium;

a filler powder;

a resin including one of thermoplastic resin and thermosetting resin; and an additive, wherein the filler powder contains at least one element selected from the group consisting of tungsten, nickel, cobalt, copper, iron, chromium, silicon, carbon manganese, molybdenum, titanium, zinc, lead, tin, and aluminum.

6. A rare-earth containing iron-base resin-bonded magnet as claimed in claim 5, wherein the magnet has inertia and magnetic characteristics are determined by the relative amounts of the iron-based magnetic powder and said filler powder.

7. A method for manufacturing a rare-earth containing iron-base resin-bonded magnet, comprising the steps of:

mixing an iron-base magnetic powder that contains a rare earth metal selected from the group consisting of neodymium and praseodymium with one of thermoplastic resin and thermosetting resin, and an additive;

mixing a filler powder with a resin including one of thermoplastic resin and thermosetting resin and an additive; and forming a predetermine shape by molding, wherein the filler powder contains at least one element selected from the group consisting of tungsten, nickel, cobalt, copper, iron, chromium, silicon, carbon manganese, molybdenum, titanium, zinc, lead, tin, and aluminum.

8. A method for manufacturing a rare-earth containing iron-base resin-bonded magnet according to claim 7 wherein the rare-earth containing iron-base resin-bonded magnet is formed by injection molding.

9. A method for manufacturing a rare-earth containing iron-base resin-bonded magnet according to claim 7 wherein the rare-earth conbtaining iron-base resin-bonded magnet is formed by compression molding.

10. A method for manufacturing a rare-earth containing iron-base resin-bonded magnet according to claim 7 wherein the rare-earth containing iron-base resin-bonded magnet is formed by extrusion molding.

11. A rare earth-iron resin-bonded magnet comprising:

magnetic powder of the iron family containing rare earths;

tungsten alloy filler powder having a specific gravity greater than that of the magnetic powder of the ion family;

thermosetting resin; and an additive, wherein the rare earth-iron resin-bonded magnet is formed by compression-molding the mixture.

12. A rare earth-iron resin-bonded magnet as claimed in claim 11, wherein the resin constitutes within 1–3 wt %, the filler constitutes within 20–50 w % and magnetic powder constitutes a remaing part in a weight ratio and, wherein the filler has a means grain size of not less than 30 μm.

13. A rare earth-iron resin-bonded magnet as claimed in one of the claims 11 and 12, wherein the filler is an alloy of W and at least one element selected from among Ni, Co and Fe and W and is within 25–45 w % in a weight ratio.

14. A rare earth-iron resin-bonded magnet as claimed in any one of the claims 11 to 13, wherein the filler is an alloy of W and Ni, and constitutes 36 wt %, and the filler constitutes 36 wt % in a weight ratio, and wherein a rust preventive resin coating is applied to at least one of the inner and outer periphery of the magnet.

15. A rare earth-iron resin-bonded magnet as claimed in any one of the claims 11 to 14, wherein the filler is an alloy of W and Ni, and constitutes 45 wt %, and the filler constitutes 31 wt % in a weight ratio, and wherein a rust preventive resin coating is applied to at least one of the inner and outer periphery of the magnet.

16. A bonded magnet comprising:

a synthetic resin binder;

a magnetic powder containing rare earth metal, iron and boron; and a mixture of Ni-W alloy mixed powder with at least one element selected from among Cr, Mo, Zn and Al.

17. A bonded magnet as claimed in claim 16, wherein the Ni-W alloy powder contains within 64–70 wt % Ni, W within 36–30 wt % W, and at least one element Cr, Mn, Zn and Al whose loadings range from 1 to 10 wt %.

18. A corrosion resistant bonded magnet comprising:

a synthetic resin binder;

a magnetic powder containing rare earth metal, iron and boron; and a mixture of Ni-W alloy mixed powder with an additive consisting one element selected from the group consisting of Cr, Mn, Zn, and Al, whereby an electrode potential difference between the magnetic powder and the mixture of Ni-W with the additive is reduced.

* * * * *